United States Patent [19]

Oshima

[11] Patent Number: 4,569,405
[45] Date of Patent: Feb. 11, 1986

[54] DISPERSION FEEDER FOR COMBINATION WEIGHING MACHINE

[75] Inventor: Yasushi Oshima, Akashi, Japan

[73] Assignee: Yamato Scale Company, Limited, Japan

[21] Appl. No.: 587,541

[22] Filed: Mar. 8, 1984

[30] Foreign Application Priority Data

Mar. 16, 1983 [JP] Japan .............................. 58-37870[U]

[51] Int. Cl.⁴ ...................... G01G 19/22; B65G 47/18
[52] U.S. Cl. ........................................ 177/25; 177/58; 198/505; 198/565; 222/478
[58] Field of Search ................... 177/25, 58, DIG. 12; 222/199, 200, 478; 198/445, 446, 505, 565

[56] References Cited

U.S. PATENT DOCUMENTS 4,344,492  8/1982  Hirano .................................. 177/25
4,398,612  8/1983  Mikami et al. .................... 177/58 X

FOREIGN PATENT DOCUMENTS 57-160021  of 0000  Japan .
   888357  of 0000  Japan .
  2064496  of 0000  United Kingdom .

Primary Examiner—George H. Miller, Jr.
Attorney, Agent, or Firm—Senniger, Powers, Leavitt and Roedel

[57] ABSTRACT

A device, so-called dispersion feeder, for feeding product to be weighed from a single source to a plurality of weighing units of a combination weighing machine which are arranged in a circular array. The device, which is generally of a circular shape, is disposed in the center of the circular array of weighing units and distributes the product fed from the source to its central portion, to the respective weighing units towards the radial direction. The improvement in this device is that entangled aggregates of the product can be automatically dispersed before leaving outlet ports provided on the periphery for the respective weighing units.

13 Claims, 3 Drawing Figures

DISPERSION FEEDER FOR COMBINATION WEIGHING MACHINE

This invention relates to a device for feeding product to be weighed from a single source to a plurality of weighing units of a combination weighing machine, arranged in a circular array. Such device is sometimes referred to as a "dispersion feeder" or "distribution feeder".

A combination weighing machine of circular array type, to which the device of this invention is applicable, is disclosed, for example, in U.S. Pat. No. 4,344,492 and opened Japanese patent specification No. 57-160021. In this type of combination weighing machine, a plurality of weighing units are arranged in a circular array and above the level of the weighing units. A quantity of product to be weighed is fed from a single source to the central portion of the dispersion feeder, which may be subject to mechanical vibration, through a belt conveyor, for example, and shifted successively toward the periphery. The dispersion feeder has a plurality of outlet ports or gates on the periphery, which communicate with weighing hoppers of the respective weighing units directly or through respective intermediate conveyors. Thus, the product is fed to the weighing hopper of each weighing unit in selective fashion as well known in the art. Operation and use of the combination weighing machine are well known in this field and also described in the above citations.

Typical examples of the dispersion feeder are described, for example, in U.K. Pat. No. B 2,064,496 and Japanese Patent No. 888,357. Such prior art dispersion feeders are of circular dish type or conical disc type and each have a peripheral wall provided with a plurality of outlet ports or gates corresponding to the respective weighing units. The dispersion feeder may be provided with a vibrating unit, for example, of electromagnetic type so that it is subjected to mechanical helical or vertical vibration to aid dispersion of the product toward the periphery and discharge thereof from the selected gates.

Such prior art dispersion feeders have operated successfully with those product having a relatively simple shape such as a ball or cube shape, but have suffered from a serious problem with those product having a relatively elongated or twisted shape as in the case of stick candies, candies in twisted wrappers or beans in their pods. Such products have a tendency of forming a mutually entangled aggregation on the feeder. Such aggregation can disturb a smooth flow of product and, at the exit gates of the feeder, it may block the gates or result in undesirable excessive feeding.

Accordingly, an object of this invention is to provide a dispersion feeder of improved and simple structure which can automatically separate and disperse the aggregation of product into discrete pieces before reaching the gates to maintain smooth and constant delivery.

This object can be attained by a dispersion feeder according to this invention, which comprises a main body which is generally conical in shape and has a surface in which are formed radial valley regions and intervening radial ridge regions, and a driving unit for applying a mechanical vibration to the main body. As a feature of this invention, the ridge regions extend outwards beyond the ends of the valley regions, thereby forming cutouts between the extending ridge regions at the periphery of the main body.

This and other features and operation of this invention will be described in more detail hereinunder with reference to an embodiment as shown in the accompanying drawings.

In the drawings.

Throughout the drawings, the same reference numerals are given to the same structural components.

Figure 1:
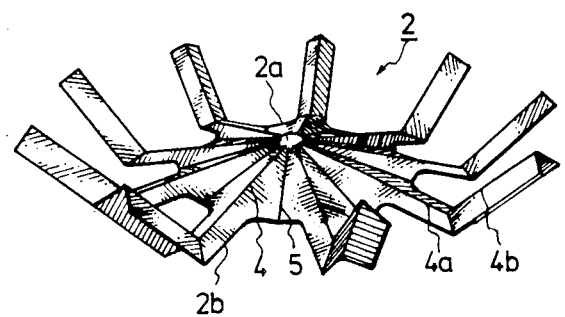
FIG. 1 is a perspective view of a main body of an embodiment of dispersion feeder according to this invention.
Figure 2:
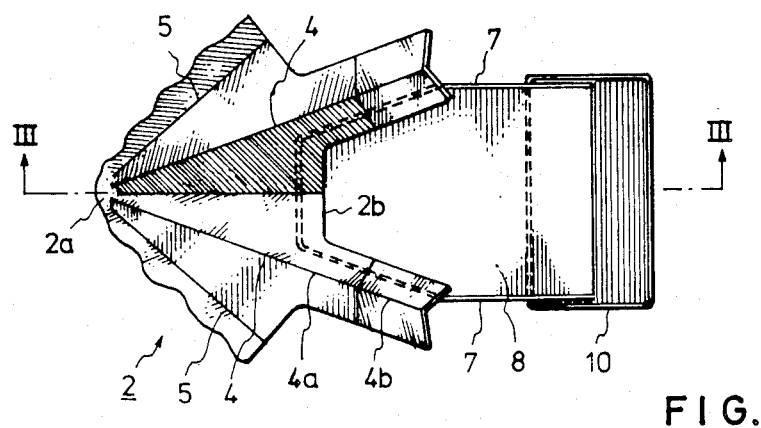
FIG. 2 is a plan view representing a part of the dispersion feeder of FIG. 1 arranged in combination with an intermediate conveyor and a holding hopper.

Referring to FIG. 1, a main body of the dispersion feeder according to this invention is shown generally by 2. The body 2 is a unitary structure preferably made from a suitable metal sheet, such as stainless steel sheet, by using steps of punching and press-forming, while it may be made of plastic material by injection molding. The body 2 has the general shape of a flat cone having a wavy surface composed of a plurality of radial ridge regions 4 and intervening valley regions 5. The number of ridge regions 4 or valley regions 5 is same as the number of weighing units in a combination weighing machine in which the dispersion feeder is used. As illustrated in FIGS. 1 and 2, the valley regions (troughs) are generally V-shaped in transverse section with a bottom and upwardly and outwardly diverging side walls, adjacent walls of adjacent valley regions being integrally joined along their respective margins to form the aforesaid ridge regions 4. All the ridge and valley regions 4 and 5 are integrally connected to a central substantially flat or spherical top portion 2a to which a quantity of product to be weighed is fed from a single source not shown in the drawings. The ridge regions 4 extend outwards beyond the ends of the valley regions 5 to form guard arms 4a embracing cutouts 2b, respectively. In this embodiment, the end portions 4b of the guard arms 4a are raised angularly (inclined upwardly) from the horizontal plane, as shown.

Figure 3:
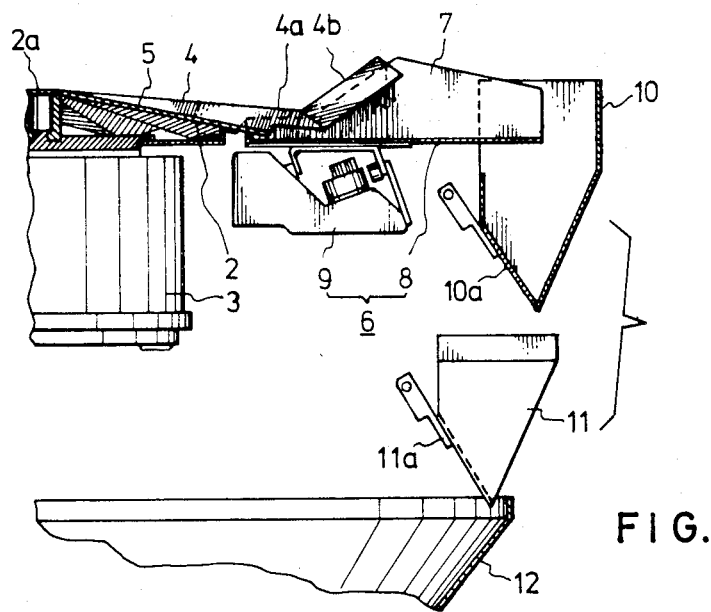
FIG. 3 is a side view, partly in section along a line III—III of FIG. 2, of the arrangement of FIG. 2 together with a weighing hopper and a collecting chute.

Referring next to FIGS. 2 and 3, the body 2 is supported on a vibrator unit 3 (constituting drive means) which is in turn supported on a machine frame (not shown). The vibrator unit 3 is of a conventional type for subjecting the main body 2 to mechanical vibration, which includes preferably a component of rotational vibration, such as helical vibration. Thus the ridge and valley regions 4, 5 vibrate conjointly (together). Disposed under each cutout 2b of the body 2 of the dispersion feeder, is a platform 8 of a vibration conveyor 6, which has a pair of generally triangular side walls 7. The vibration conveyor 6 also includes a vibrator unit 9 for supporting the platform 8 and subjecting it to slanting linear vibration to shift the product fed thereon forward to a holding hopper 10 disposed at its front outer end, as shown. The platform 8 of the vibration conveyor 6 is designed so that it can be arranged close to but not in contact with adjoining platforms and the rear halves of the triangular side walls 7 of adjoining platforms 8 can be covered by a common guard arm 4a of the dispersion feeder to prevent the product from falling into the gap therebetween.

A weighing hopper 11 interlocked with each weighing unit (not shown) is disposed under the holding hopper 10 and a common collecting chute 12 is disposed under all of the weighing hoppers 11 of the machine. The hoppers 10 and 11 are provided with gate doors 10a and 11a, respectively, which are automatically controlled as disclosed in the aforementioned United States patent.

In operation, product fed to the center portion 2a of the feeder is shifted radially down the slope of the body 2 by the aid of vibration applied by the vibrator unit 3. If an entangled aggregation exists in the fed product, it is broken up into pieces as it falls down from the ridge 4 to the valley 5 and these pieces are arranged longitudinally along the valley 5 and fed smoothly and constantly onto the platform 8 of each vibration conveyor 6. Such smooth and constant flow of product will result in a uniform dose of product fed into the holding hopper 10 by actuation of the vibrator unit 9 for a predetermined duration of time.

As described above, the guard arms 4a of the dispersion feeder serve a function of covering the gaps between the adjoining platforms 8 but no function of breaking up the entangled aggregation of product, which is the main object of this invention. Therefore, the inventive dispersion feeder need not always have other guard arms, especially when such "gap guard" measures are taken, as in the device of aforementioned Japanese specification.

I claim:

1. A dispersion feeder, used in a combination weighing machine including a plurality of weighing units arranged in circular array; comprising a generally conical body and a driving unit for providing mechanical vibration to said body; characterized in that said body includes radial valley regions of the same number as that of said weighing units, and intervening radial ridge regions, said ridge and valley regions being formed in the surface of said body in alternating fashion and being joined for conjoint vibration by said driving unit.

2. A dispersion feeder, according to claim 1, characterized in that said ridge regions extend further beyond said valley regions in radial direction.

3. A dispersion feeder, according to claim 1, wherein portions of said ridge regions extending beyond said valley regions are inclined upwardly.

4. A dispersion feeder, according to claim 1, wherein said body has a central portion, said radial ridge and valley regions extending radially outwardly and downwardly from said central portion.

5. A dispersion feeder, according to claim 4, wherein portions of said ridge regions extending outwardly beyond said valley regions are inclined upwardly.

6. Apparatus for feeding product to weighing units arranged in a circle, comprising a plurality of radially extending vibratory conveyors feeding product to said weighing units, and a dispersion feeder comprising a generally conical body mounted centrally of said vibratory conveyors for dispersing product loaded onto the feeder to said vibratory conveyors, said body having a plurality of radially extending troughs formed therein, one trough for each weighing unit and associated vibratory conveyor, each trough being generally V-shaped in transverse section with a bottom and diverging side walls extending upwardly and outwardly from the bottom, adjacent walls of adjacent troughs being joined along their respective margins to form radially extending ridges separating the troughs from one another, entangled product falling onto said body being adapted to be broken up by said ridges to provide a more uniform feed of product, and a drive unit for vibrating said troughs and ridges conjointly to feed product in said troughs to said vibratory conveyors for subsequent feeding to said weighing units.

7. Apparatus as set forth in claim 6 wherein said body is a unitary structure, said troughs being integrally joined along respective margins to form said ridges.

8. Apparatus as set forth in claim 7 wherein said body has a central portion, said radial ridge and valley regions extending radially outwardly and downwardly from said central portion.

9. Apparatus as set forth in claim 8 wherein portions of said ridge regions extending outwardly beyond said valley regions are inclined upwardly.

10. A dispersion feeder adapted for use in a combination weighing machine of the type having a plurality of weighing units arranged in a circle fed by a plurality of radially extending vibratory conveyors extending radially inwardly with respect to said units, said feeder comprising a generally conical body adapted to be mounted centrally with respect to said weighing units and said vibratory conveyors and being adapted to disperse product loaded onto the feeder to said vibratory conveyors for conveyance to said weighing units, said conical body having a plurality of radially extending troughs formed therein, one trough for each weighing unit and respective vibratory conveyor, each trough being generally V-shaped in transverse section with a bottom and diverging side walls extending upwardly and outwardly from the bottom, adjacent walls of adjacent troughs being joined along their upper margins to form radially extending ridges separating the troughs from one another, entangled product falling onto said body being adapted to be broken up by said ridges to provide a more uniform feed of product, and a unit for vibrating said body to feed product in said troughs to said vibratory conveyors for subsequent feeding to said weighing units.

11. Apparatus as set forth in claim 10 wherein said body is a unitary structure, said troughs being integrally joined along respective margins to form said ridges.

12. A dispersion feeder as set forth in claim 11 wherein said body has a central portion, said radial ridge and valley regions extending radially outwardly and downwardly from said central portion.

13. A dispersion feeder as set forth in claim 12 wherein portions of said ridge regions extending outwardly beyond said valley regions are inclined upwardly.

* * * * *